(12) United States Patent
Ono et al.

(10) Patent No.: US 7,760,401 B2
(45) Date of Patent: Jul. 20, 2010

(54) VOLTAGE RECORDER, IMAGE PROCESSING APPARATUS, AND VOLTAGE RECORDING METHOD

(75) Inventors: Noboru Ono, Saitama (JP); Tsutomu Hoshino, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 502 days.

(21) Appl. No.: 11/905,739

(22) Filed: Oct. 3, 2007

(65) Prior Publication Data
US 2008/0180266 A1 Jul. 31, 2008

(30) Foreign Application Priority Data
Jan. 26, 2007 (JP) .............................. 2007-016975

(51) Int. Cl.
*H04N 1/00* (2006.01)
(52) U.S. Cl. ...................... 358/400; 358/471; 358/437; 358/296
(58) Field of Classification Search ................. 358/400, 358/406, 471, 474, 437, 500, 504, 505, 296, 358/404; 324/72, 76.11, 76.15, 76.38; 340/661
See application file for complete search history.

(56) References Cited

U.S. PATENT DOCUMENTS 6,452,373 B2 * 9/2002 Medelius et al. .............. 324/72
7,006,934 B2 * 2/2006 Jonker et al. .................. 702/61

FOREIGN PATENT DOCUMENTS

JP A 2005-301476 10/2005

* cited by examiner

*Primary Examiner*—Cheukfan Lee
(74) *Attorney, Agent, or Firm*—Oliff & Berridge, PLC

(57) ABSTRACT

A voltage recorder includes: a receiver that receives a signal from an apparatus operating on power supplied from a power supply circuit, notifying an operational status of the apparatus; a first memory that stores sampling periods in association with an operational status of the apparatus; a sampling period determining unit that determines, with reference to the first memory, a sampling period on the basis of the operational status of the apparatus notified by the signal received from the apparatus; a voltage data generating unit that samples a voltage supplied from the power supply circuit in the determined sampling periods, and generates measured voltage data indicative of the sampled voltage; an abnormality notification unit that compares the voltage indicated by the generated measured voltage data and a predetermined threshold, and determines whether to send an abnormality notification signal depending on a result of the comparison.

9 Claims, 4 Drawing Sheets

VOLTAGE RECORDER, IMAGE PROCESSING APPARATUS, AND VOLTAGE RECORDING METHOD

CROSS-REFERENCE TO RELATED APPLICATIONS

This application is based on and claims priority under 35 USC 119 from Japanese Patent Application No. 2007-016975 filed on Jan. 26, 2007.

BACKGROUND

1. Technical Field

The present invention relates to a voltage recorder, an image processing apparatus, and a voltage recording method.

2. Related Art

Some image processing apparatuses have an energy saving mode whereby supply of an electric current to a component not in use can be suspended, or operation of the component not in use can be suspended. In such a device, when a normal operation mode is switched to an energy saving mode, there is a substantial drop in voltage supplied from the power source. Conversely, when an energy saving mode is reverted to a normal operation mode, there is a substantial rise in a voltage supplied. Such changes in voltage supply are inherently problematic in that they can cause system errors.

By analyzing a voltage supplied from a power source, it is possible to determine a cause of a system error. However, a change of a voltage shortly before occurrence of a system error is not recorded in a conventional image processing apparatus; therefore, it is difficult to determine the cause of a system error.

SUMMARY

An aspect of the present invention provides A voltage recorder including: a receiver that receives a signal from an apparatus operating on power supplied from a power supply circuit, notifying an operational status of the apparatus; a first memory that stores sampling periods in association with an operational status of the apparatus; a sampling period determining unit that determines, with reference to the first memory, a sampling period on the basis of the operational status of the apparatus notified by the signal received from the apparatus; a voltage data generating unit that samples a voltage supplied from the power supply circuit in the determined sampling periods, and generates measured voltage data indicative of the sampled voltage; a second memory that stores the generated measured voltage data; and an abnormality notification unit that compares the voltage indicated by the measured voltage data stored in the second memory and a predetermined threshold, and determines whether to send an abnormality notification signal depending on a result of the comparison.

BRIEF DESCRIPTION OF THE DRAWINGS

Exemplary embodiments of the present invention will now be described in detail with reference to the following figures, wherein.

DETAILED DESCRIPTION

A. Configuration

An exemplary embodiment of the present invention will be described with reference to the drawings.

A-1. System Configuration

Figure 1:
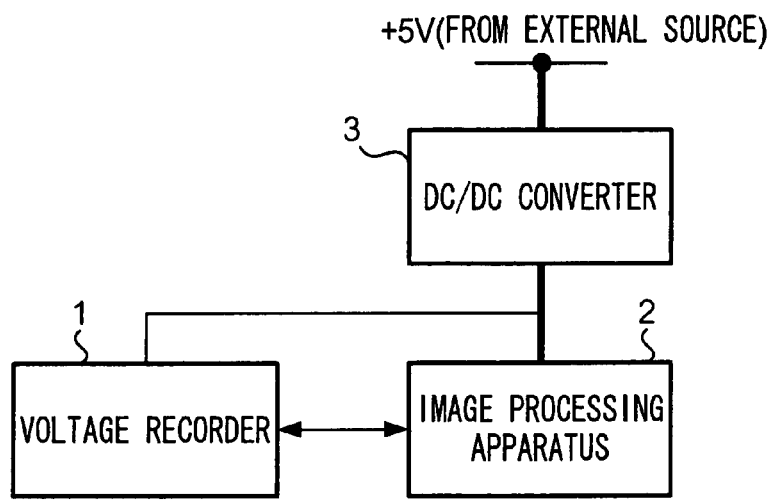
FIG. 1 is a block diagram illustrating a voltage recorder and an image processing apparatus according to the present invention.

FIG. 1 is a diagram illustrating a configuration of a system including voltage recorder 1 and image processing apparatus 2.

Image processing apparatus 2 is a multifunctional apparatus that serves as a copier, scanner, printer, or facsimile. DC/DC converter 3 decreases a voltage (5V) supplied from an external source to 3.3V, and supplies the decreased voltage to image processing apparatus 2.

Voltage recorder 1 always measures a voltage supplied from DC/DC converter 3 to image processing apparatus 2, and if a measured value is abnormal, records a change of the voltage shortly before the occurrence of the abnormal voltage. As shown in FIG. 1, a feed line for supplying power from DC/DC converter 3 to image processing apparatus 2 branches into two lines, one of which is connected to voltage recorder 1. However, voltage recorder 1 operates on power supplied from its own internal power source.

Voltage recorder 1 and image processing apparatus 2 each have an I/F unit, by which they are able to exchange signals.

A-2. Configuration of Image Processing Apparatus

Figure 2:
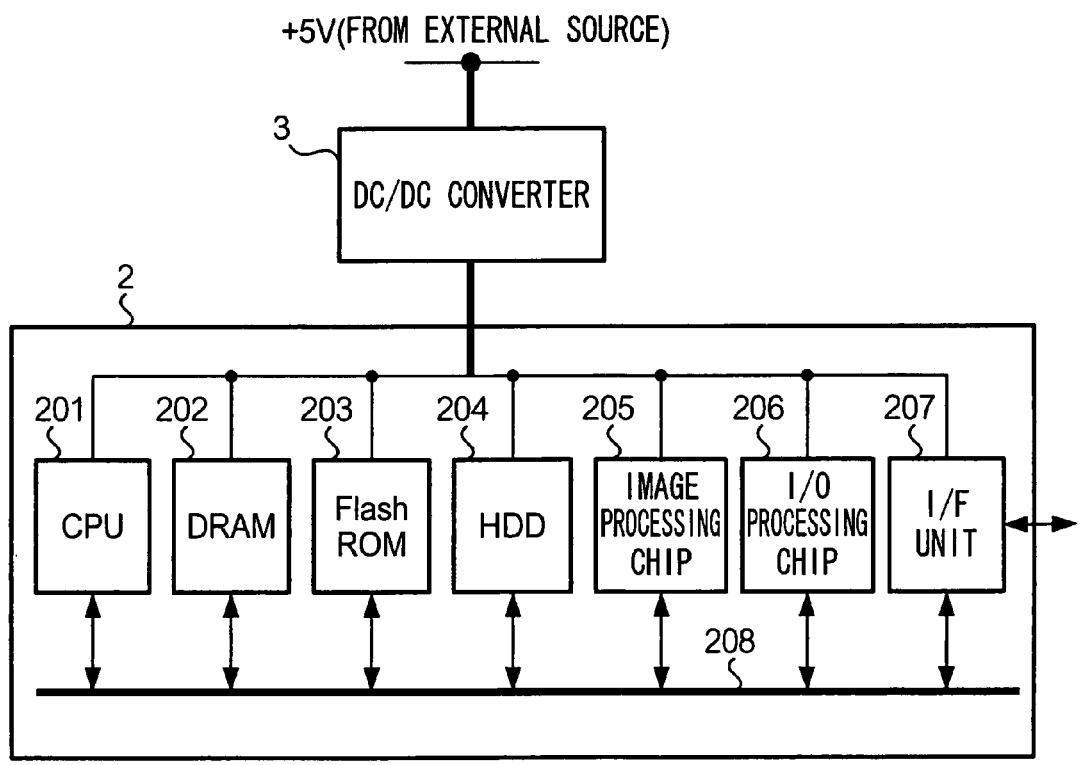
FIG. 2 is a block diagram illustrating a hardware configuration of an image processing apparatus.

FIG. 2 is a block diagram illustrating an example of a hardware configuration of image processing apparatus 2. As shown in the drawing, image processing apparatus 2 includes CPU (Central Processing Unit) 201, DRAM 202, flash ROM 203, HDD 204, image processing chip 205, I/O processing chip 206, and I/F unit 207. The components are interconnected via bus 208, and exchange signals with each other. The components operate on power supplied from DC/DC converter 3.

In image processing apparatus 2, CPU 201 executes a program stored in HDD 204 to cause components to carry out an operation for processing an image. Specifically, CPU 201 stores image data, which is obtained via an input unit (not shown) or a communication network, in DRAM 202. Image processing chip 205 reads the image data from DRAM 202, and carries out necessary processing on the image data. Flash ROM 203 stores the processed image data.

I/O processing chip 206 receives an instruction input by a user via a user interface (not shown), and transfers the instruction to CPU 201. I/O processing chip 206 also outputs the processed image data via an output unit (not shown).

I/F unit 207 mediates signal exchange with voltage recorder 1. I/F unit 207 receives a signal from voltage recorder 1 and transfers the signal to CPU 201, and sends a signal generated by CPU 201 to voltage recorder 1.

Image processing apparatus 2 has two operational modes, a normal operation mode and an energy saving mode. In a normal operation mode image processing apparatus 2 operates on a normal power supply, specifically a decreased voltage of 3.3V is supplied from DC/DC converter 3 to image processing apparatus 2. In an energy saving mode power supply to most components of image processing apparatus 2 is suspended to conserve energy, and is used when no action is made for a predetermined time period, even though image processing apparatus 2 is in a power-on state. Even in an energy saving mode, some components of image processing apparatus 2 such as a circuit for monitoring a trigger to return to a normal operation mode (not shown) is fed.

CPU 201, if no key input is made for a predetermined time period, or a power button is pressed, when image processing apparatus 2 is in a normal operation mode, switches the operational mode from a normal operation mode to an energy saving mode. Specifically, CPU 201 disconnects a power supply circuit of predetermined components. On the other hand, if any key of image processing apparatus 2 is manipulated, or any instruction of an operation is received via a communication network (not shown), when image processing apparatus 2 is in an energy saving mode, CPU 201 switches an operational mode from an energy saving mode to a normal operation mode. Specifically, CPU 201 re-connects the power supply circuit that is disconnected in an energy saving mode.

CPU 201, before switching an operational mode, generates an advance signal notifying which mode an operational mode is to be switched to, and sends the signal to voltage recorder 1. Also, CPU 201, after sending an advance signal and completing a switching of an operational mode, namely disconnecting or re-connecting a power supply circuit of predetermined components, sends a completion signal notifying the completion of a switching of an operational mode to voltage recorder 1. In the following description, an advance signal and a completion signal are collectively referred to as a "mode signal".

A-3. Configuration of Voltage Recorder 1

Figure 3:
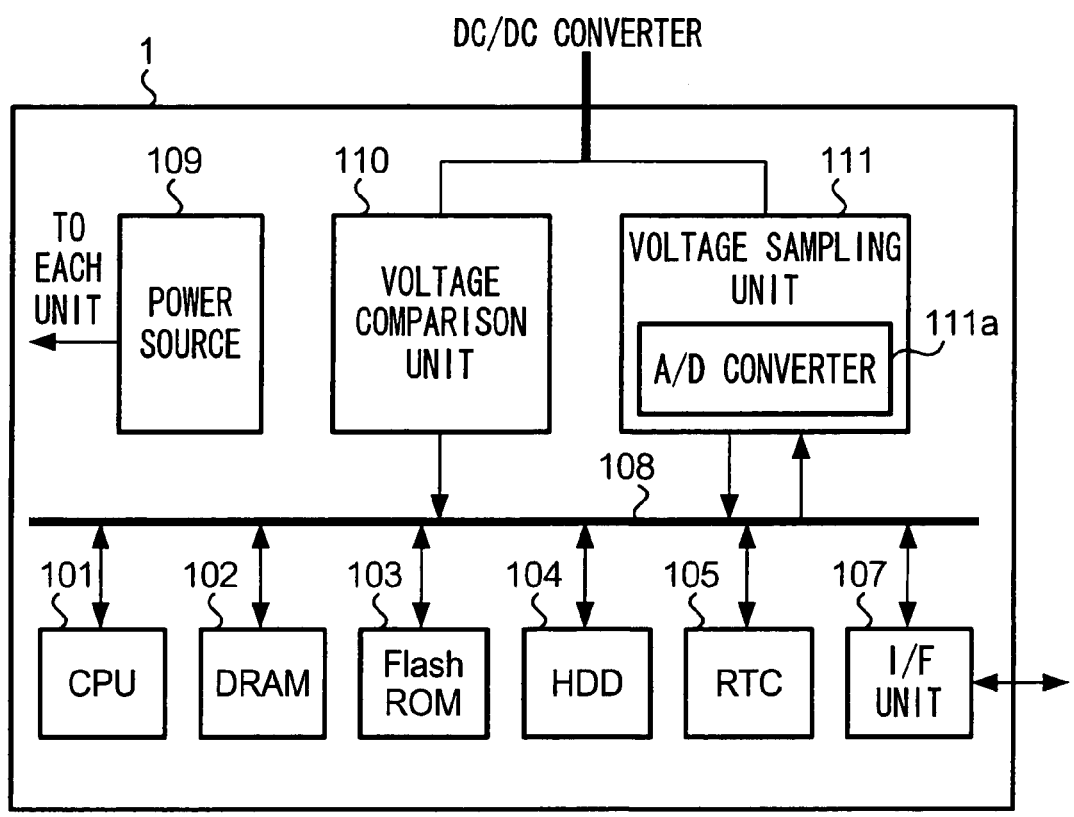
FIG. 3 is a block diagram illustrating a hardware configuration of a voltage recorder.

FIG. 3 is a block diagram illustrating an example of a configuration of voltage recorder 1. Components of voltage recorder 1 are interconnected with bus 108, and exchange signals with each other. The components operate on power supplied from power source 109 built into voltage recorder 1.

CPU 101 shown in FIG. 3 controls components of voltage recorder 1 in accordance with a program.

Voltage sampling unit 111 measures a voltage supplied from DC/DC converter 3, and binarizes the measured voltage using A/D converter 111a, to generate measured voltage data. CPU 101 writes measured voltage data generated by voltage sampling unit 111 in DRAM 102.

Periods in which voltage sampling unit 111 samples a voltage supplied from DC/DC converter 3 are determined on the basis of a mode signal. CPU 101 receives a mode signal notifying an operational status of image processing apparatus 2 via I/F unit 107, and determines a sampling period by checking the operational status against a table included in the program stored in HDD 104.

Figures 5, 6:
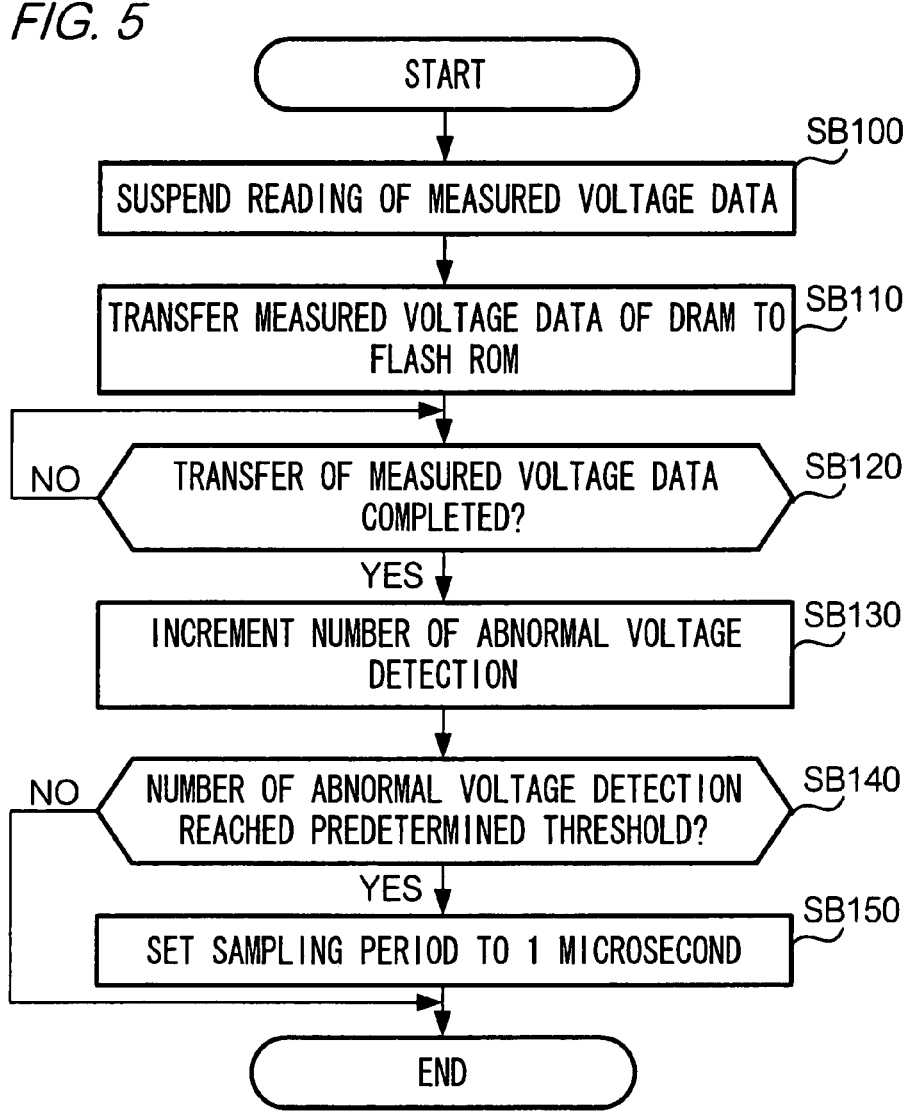
FIG. 5 is a flowchart showing an operation of a voltage recorder performed when an abnormal voltage is generated.
FIG. 6 is a an example of a table relating sampling period to operational status.

FIG. 6 is a diagram illustrating an example of the table. On receiving a completion signal notifying that a switching of an operation mode from an energy saving mode to a normal operation mode is completed, from image processing apparatus 2, CPU 101 sets a sampling period of voltage sampling unit 111 to 10 microseconds in accordance with the table. On receiving a completion signal notifying that a switching of an operation mode from a normal operation mode to an energy saving mode is completed from image processing apparatus 2, CPU 101 sets a sampling period of voltage sampling unit 111 to 100 microseconds in accordance with the table. During a process of switching an operational mode, namely in a period after receiving an advance signal, which is sent prior to a switching of an operation mode, and until receiving a completion signal, which is sent after the switching of an operational mode is completed, CPU 101 sets a sampling period of voltage sampling unit 111 to 1 microsecond.

As described in the foregoing, a sampling period of a process of switching an operational mode is shorter than that of a normal operation mode, and a sampling period of an energy saving mode is longer than that of a normal operation mode.

As a result, in an energy saving mode, measured voltage data whose sampling period is short is generated, and in a period when an operational mode is switched, measured voltage data whose sampling period is further shorter is generated.

DRAM 102 serves as a buffer memory that stores measured voltage data of predetermined sampling periods generated by voltage sampling unit 111. DRAM 102 according to the present exemplary embodiment stores measured voltage data of 1000 sampling periods as measured voltage data necessary for data analysis. Measured voltage data stored in DRAM 102 is updated when a new piece of measured voltage data is output from voltage sampling unit 111, by replacing the oldest piece of measured voltage data with the new piece of measured voltage data. Therefore, DRAM 102 always stores measured voltage data of the most recent 1000 sampling periods.

The length of time covered by measured voltage data to be stored in DRAM 102 depends on a sampling period of measured voltage data. For example, if a sampling period is 1 microsecond, measured voltage data of 1 millisecond is recorded, and if a sampling period is 100 microseconds, measured voltage data of 100 milliseconds is recorded.

Voltage comparison unit 110 determines whether a voltage supplied from DC/DC converter 3 is abnormal. Specifically, voltage comparison unit 110 reads measured voltage data written in DRAM 102, compares the measured voltage with a predetermined threshold, and if the measured voltage exceeds the threshold, sends an abnormal voltage signal to CPU 101. A threshold of the present exemplary embodiment is 3.5V.

Flash memory 103 and HDD 104 are nonvolatile storage devices having storage capacity necessary for carrying out the present exemplary embodiment. HDD 104 stores a program for causing CPU 101 to carry out an operation characteristic of voltage recorder 1, and relevant data. HDD 104 also stores the number of times an abnormal voltage is detected by voltage comparison unit 110. The number is incremented by CPU 101 that receives an abnormal voltage signal from voltage comparison unit 110.

I/F unit 107 mediates signal exchange with image processing apparatus 2. I/F unit 107 receives a signal from image processing apparatus 2 and transfers the signal to CPU 101, and sends a signal generated by CPU 101 to image processing apparatus 2.

RTC (Real Time Clock) 105 generates data indicative of a current time.

B. Operation

An operation of voltage recorder 1 according to the present exemplary embodiment will be described. First, an instance where a voltage of electric power supplied to image processing apparatus 2 is normal will be described, and second, an instance where a voltage of electric power supplied to image processing apparatus 2 is abnormal will be described.

B-1. Operation Example 1

The present operation example relates to a case where a voltage of electric power supplied to image processing apparatus 2 is normal. In describing the operational example, it is assumed that voltage recorder 1 and image processing apparatus 2 are in a power-on state, and have been initialized at the start point.

Figure 4:
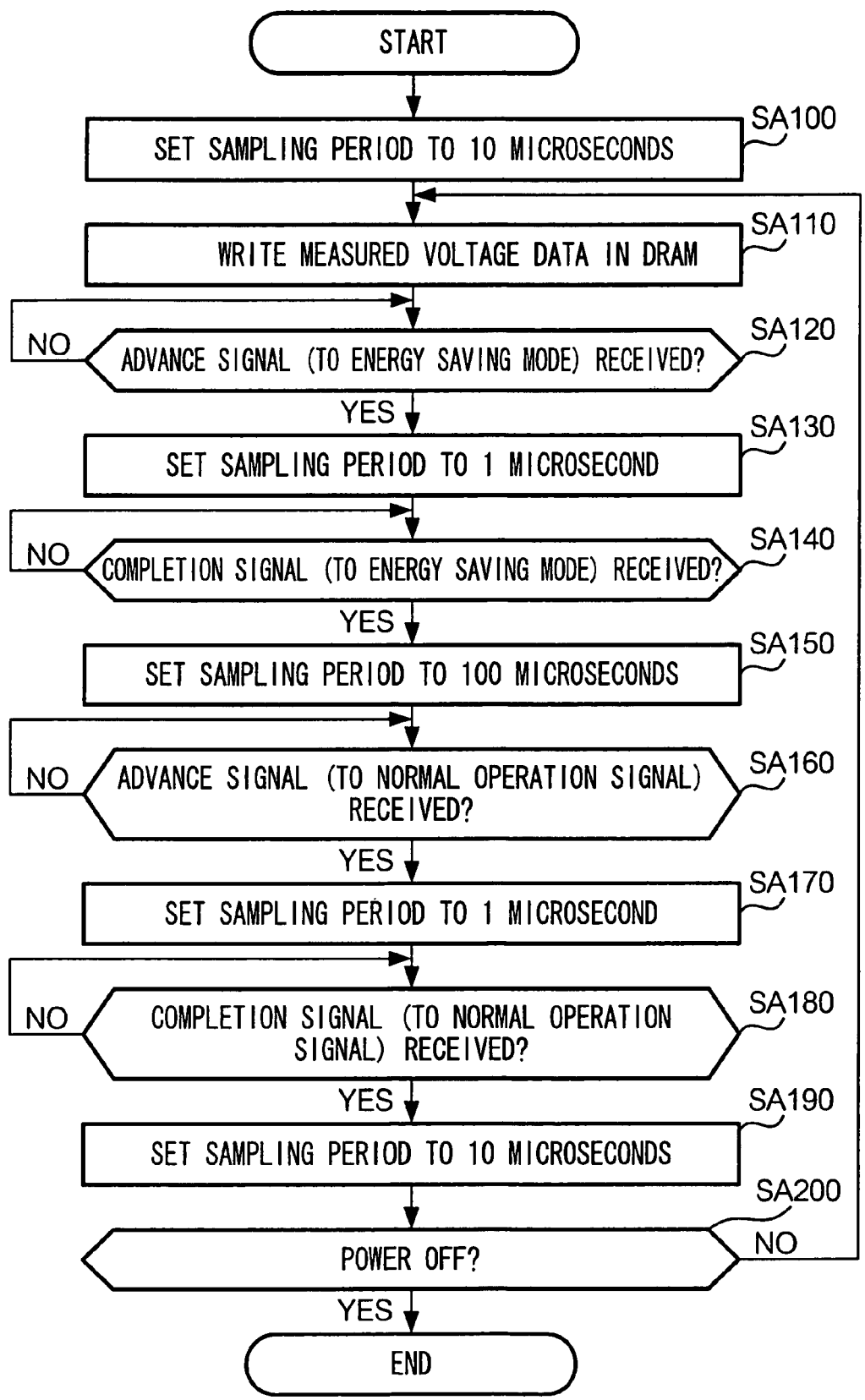
FIG. 4 is a flowchart showing an operation of a voltage recorder.

FIG. 4 is a flowchart of an operation of voltage recorder 1 performed when a voltage of electric power supplied to image processing apparatus 2 is normal. CPU 101 sets a sampling period of voltage sampling unit 111 to 10 microseconds (step SA100). If the sampling period is already set to 10 microseconds, the setting remains unchanged.

Voltage sampling unit 111 measures a voltage supplied from DC/DC converter 3, in the set sampling periods, and generates measured voltage data indicative of the measured voltage. CPU 101 writes the generated measured voltage data in DRAM 102 (step SA110).

While voltage sampling unit 111 samples a voltage supplied from DC/DC converter 3, voltage comparison unit 110 reads measured voltage data written in DRAM 102, and compares a measured voltage indicated by the data and a predetermined threshold voltage. As a result of the comparison, if the measured voltage exceeds the predetermined threshold voltage, namely, if an abnormal voltage is detected, a process for addressing an abnormal voltage is carried out as an interrupt process. The process for addressing an abnormal voltage will be described later.

CPU 101 determines whether image processing apparatus 2 has received an advance signal notifying that an operational mode is switched from a normal operation mode to an energy saving mode (step SA120). If image processing apparatus 2 is constantly operated by a user, the determination of step SA120 turns out to be negative, and step SA120 is repeated. On the other hand, if image processing apparatus 2 is not operated by a user for a predetermined time period, a switching of an operational mode of image processing apparatus 2 from a normal operation mode to an energy saving mode is started, and CPU 201 sends an advance signal to voltage recorder 1, notifying that an operational mode will be switched from a normal operation mode to an energy saving mode. When CPU 101 of voltage recorder 1 receives the advance signal, the determination of step SA120 turns out to be affirmative, and subsequently step SA130 is carried out.

At step SA130, CPU 101 sets a sampling period of voltage sampling unit 111 with reference to a table (see FIG. 6) stored in HDD 104. Since the advance signal received by CPU 101 is a signal notifying that an operational mode will be switched from a normal operation mode to an energy saving mode, CPU 101 sets a sampling period to 1 microsecond. While CPU 101 carries out step SA130, image processing apparatus 2 switches an operational mode from a normal operation mode to an energy saving mode. After completing the switching operation, CPU 201 of image processing apparatus 2 sends a completion signal to voltage recorder 1, notifying that a switching of an operational mode is completed. At step SA140, CPU 101 of voltage recorder 1 determines whether voltage recorder 1 has received a completion signal from image processing apparatus 2. If the determination is negative, step SA140 is repeated until a completion signal is received. On the other hand, if the determination is affirmative, namely, a completion signal is received by CPU 101, step SA150 is carried out.

At step SA150, CPU 101 sets a sampling period of voltage sampling unit 111 to 100 microseconds, that is, a sampling period associated with an operational status in the table that a switching of an operational mode to an energy saving mode is completed. While image processing apparatus 2 is in an energy saving mode, voltage sampling unit 111 of voltage recorder 1 generates measured voltage data in the sampling periods of 100 microseconds. In the current situation, if any key of image processing apparatus 2 is manipulated, or any instruction of an operation is received by image processing apparatus 2 via a communication network (not shown), CPU 201 starts a switching of an operational mode from an energy saving mode to a normal operation mode, and sends an advance signal to voltage recorder 1, notifying that an operational mode will be switched to a normal operation mode.

At step SA160, CPU 101 of voltage recorder 1 determines whether an advance signal notifying that an operational mode will be switched from an energy saving mode to a normal operation mode is received from image processing apparatus 2. If the advance signal has not been received by CPU 101 of voltage recorder 1, the determination of step SA160 turns out to be negative, and step SA160 is repeated. On the other hand, if the advance signal is received by CPU 101, the determination of step SA160 tunes out to be affirmative, and step SA170 is carried out.

At step SA170, CPU 101 sets a sampling period of voltage sampling unit 111 to 1 microsecond, with reference to the table stored in HDD 104. While CPU 101 carries out step SA170, image processing apparatus 2 switches an operational mode from an energy saving mode to a normal operation mode. After completing the switching operation, CPU 201 of image processing apparatus 2 sends a completion signal to voltage recorder 1 notifying that a switching of an operational mode is completed.

At step SA180, CPU 101 of voltage recorder 1 determines whether a completion signal has been received. If the determination is negative, step SA180 is repeated until a completion signal is received. On the other hand, if the determination is affirmative, namely, a completion signal is received by CPU 101 from image processing apparatus 2, step SA190 is carried out.

At step SA190, CPU 101 sets a sampling period of voltage sampling unit 111 to 10 microseconds with reference to the table stored in HDD 104. As a result, while image processing apparatus 2 is in a normal operation mode, voltage sampling unit 111 of voltage recorder 1 generates measured voltage data in the sampling periods of 10 microseconds.

At step SA200, CPU 101 of voltage recorder 1 determines whether image processing apparatus 2 has been turned off. If image processing apparatus 2 has been turned off, the determination is affirmative, and the present operation of voltage recorder 1 ends. On the other hand, if the determination is negative, the present operation is restarted from step SA110.

According to the operation described above, a sampling period of voltage sampling unit 111 of voltage recorder 1 is, in a normal operation mode, set to 10 microseconds; in an energy saving mode, set to 100 microseconds; and in a process of switching an operational mode, set to 1 microsecond.

Namely, a sampling period is set depending on an operational mode of image processing apparatus 2, and measured voltage data is generated in short periods during a time period when a voltage supplied from DC/DC converter 3 is likely to be abnormal.

B-2. Operation Example 2

The present operation example relates to a case where a voltage of electric power supplied to image processing apparatus 2 is abnormal.

When a voltage supplied from DC/DC converter 3 exceeds 3.5V, voltage comparison unit 110 reading measured voltage data indicative of the voltage from DRAM 102 determines that the voltage exceeds a threshold. In this case, voltage comparison unit 110 generates an abnormal voltage signal, and sends the signal to CPU 101.

After receiving the abnormal voltage signal, CPU 101 carries out a process for addressing an abnormal voltage as an interrupt process. FIG. 5 is a flowchart showing the process. CPU 101 suspends reading of measured voltage data from voltage sampling unit 111 and writing of the data in DRAM 102 (step SB100).

Subsequently, CPU 101 writes measured voltage data that has been written at the point of receiving the abnormal voltage signal, in flash ROM 103 (step SB110). Specifically, CPU 101 writes the measured voltage data in association with time data obtained from RTC 105, in flash ROM 103.

At step SB120, CPU 101 determines whether a process of transferring measured voltage data written in DRAM 102 to flash ROM 103 is completed. If the process is in progress, the determination is negative, and step SB120 is repeated. On the other hand, if the process has been completed, the determination is affirmative, and step SB130 is carried out.

At step SB130, CPU 101 increments the number of abnormal voltage detections written in HDD 104. Subsequently, CPU 101 determines whether the incremented value reaches a predetermined threshold (step SB140). If the determination is affirmative, CPU 101 sets a sampling period of voltage sampling unit 111 to 1 microsecond (step SB150). CPU 101 also ends the present process for addressing an abnormal voltage, and returns to an operation interrupted by the present process for addressing an abnormal voltage, with the set sampling period. On the other hand, if the determination is negative, CPU 101 ends the present process for addressing an abnormal voltage.

According to the process for addressing an abnormal voltage described above, if a voltage supplied to image processing apparatus 2 indicates an abnormal value a predetermined number of times, regardless of an operational mode of image processing apparatus 2, a sampling period is set shorter. As a result, detailed measured voltage data is generated after an abnormal voltage is detected a predetermined number of times, and stored in flash ROM 103 via DRAM 102. The stored measured voltage data helps a user to determine the cause of a system error.

C. Modifications

The above exemplary embodiment of the present invention may be modified as described below.

C-1. Modification 1

In the above exemplary embodiment, where voltage recorder 1 is used for recording a voltage supplied to an image processing apparatus, voltage recorder 1 may be any other electronic device operating on power supplied from an independent power source.

C-2. Modification 2

In the above exemplary embodiment, where voltage recorder 1 is described as a device independent of image processing apparatus 2, the function of voltage recorder 1 may be provided in image processing apparatus 2.

C-3. Modification 3

In the above exemplary embodiment, where a characteristic function of voltage recorder 1 is realized by software modules, the characteristic function may be realized by a combination of hardware modules.

C-4. Modification 4

In the above exemplary embodiment, where CPU 101 of voltage recorder 1 controls a sampling period of voltage sampling unit 111 depending on an operational mode of image processing apparatus 2, CPU 101 may control a sampling period depending on any other factor.

For example, CPU 101 may control a sampling period depending on an operation performed by image processing apparatus 2. In this case, operations of image processing apparatus 2 such as starting printing, starting transmission or reception of a facsimile, starting reception of print data from outside, starting scanning, and starting transmission of scanned data are associated with a sampling period in a table stored in HDD 104, and CPU 101 controls a sampling period with reference to the table.

Alternatively, in the above exemplary embodiment, immediately after image processing apparatus 2 is powered on, voltage sampling unit 111 may measure a voltage in a preset sampling period to generate measured voltage data. Alternatively, if an instruction is provided for power activation of image processing apparatus 2, the power activation may be postponed until a sampling period is set and measured voltage data is generated in voltage recorder 1.

Alternatively, CPU 101 may control a sampling period depending on the number of times a system error occurs in image processing apparatus 2. In this case, CPU 201 of image processing apparatus 2, on detecting a system error, sends an error notification signal to voltage recorder 1. On receiving the error notification signal, CPU 101 of voltage recorder 1 increments the number of occurrences of a system error that is stored in HDD 104. As a result, if the number reaches a predetermined value, CPU 101 shortens a sampling period of voltage sampling unit 111 (e.g., to 1 microsecond).

C-5. Modification 5

In the above exemplary embodiment, where while image processing apparatus 2 is in an energy saving mode, a sampling period is set to be longer, sampling may be suspended, instead of being set to be longer. This makes it possible to conserve more power in an energy saving mode.

C-6. Modification 6

In the above exemplary embodiment, where voltage recorder 1 is used relative to a single power source, voltage recorder 1 may be used relative to plural power sources. In this case, voltage recorder 1 is connected to each power source with a feed line, and voltage sampling unit 111 generates measured voltage data for each power source. The measured voltage data has an assigned identifier unique to each power source. Voltage comparison unit 110 compares a measured voltage indicated by each measured voltage data and a predetermined threshold voltage, and if the measured voltage exceeds the threshold voltage, sends an abnormal voltage signal including data indicative of a power source that has supplied the measured voltage.

C-7. Modification 7

In the above exemplary embodiment, where measured voltage data of 1000 sampling periods is stored in DRAM 102, the number of sampling periods may be any number, as long as it is enough to determine the cause of an abnormal voltage supplied from DC/DC converter 3.

C-8. Modification 8

In the above exemplary embodiment, where a sampling period is set to be shorter while an operational mode is switched, regardless of the direction of a transition of the operational mode, a sampling period may be set to be shorter only while an operational mode is switched in a predetermined direction, namely, from an energy saving mode to a normal operation mode, or from a normal operation mode to an energy saving mode.

In the above exemplary embodiment, where a sampling period of an energy saving mode is longer than that of a normal operation mode, a sampling period of both modes may be the same.

C-9. Modification 9

In the above exemplary embodiment, where measured voltage data generated by voltage sampling unit 111 is written in DRAM 102, and thereafter written in flash ROM 103 after an abnormal voltage occurs, measured voltage data may be directly written in flash ROM 103, provided that flash ROM 3 has enough storage space.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principle of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. A voltage recorder comprising:
   a receiver that receives a signal from an apparatus operating on power supplied from a power supply circuit, notifying an operational status of the apparatus;
   a first memory that stores sampling periods in association with an operational status of the apparatus;
   a sampling period determining unit that determines, with reference to the first memory, a sampling period on the basis of the operational status of the apparatus notified by the signal received from the apparatus;
   a voltage data generating unit that samples a voltage supplied from the power supply circuit in the determined sampling periods, and generates measured voltage data indicative of the sampled voltage;
   a second memory that stores the generated measured voltage data; and
   an abnormality notification unit that compares the voltage indicated by the measured voltage data stored in the second memory and a predetermined threshold, and determines whether to send an abnormality notification signal depending on a result of the comparison.

2. The voltage recorder according to claim 1, wherein:
   the first memory stores, as an operational status of the apparatus, a normal operation mode and an operational mode switching phase in which the normal operation mode is switched to an energy saving mode; and
   a sampling period associated with the operational mode switching phase is shorter than a sampling period associated with the normal operation mode.

3. The voltage recorder according to claim 1, wherein:
   the first memory stores, as an operational status of the apparatus, a normal operation mode and an operational mode switching phase in which an energy saving mode is switched t6 the normal operation mode; and
   a sampling period associated with the operational mode switching phase is shorter than a sampling period associated with the normal operation mode.

4. The voltage recorder according to claim 1, wherein:
   the first memory stores, as an operational status of the apparatus, a normal operation mode and an energy saving mode; and
   a sampling period associated with the energy saving mode is longer than a sampling period associated with the normal operation mode.

5. The voltage recorder according to claim 1, wherein:
   the first memory stores a plurality of operational statuses of the apparatus; and
   a sampling period associated with an operation status is shorter than a sampling period associated with another operation status.

6. An image processing apparatus comprising:
   an image forming unit operating on power supplied from a power supply circuit, that forms an image on the basis of an external signal; and
   a voltage recorder comprising:
   a receiver that receives a signal from the image forming unit, notifying an operational status of the image forming unit;
   a first memory that stores sampling periods in association with an operational status of the image forming unit;
   a sampling period determining unit that determines, with reference to the first memory, a sampling period on the basis of the operational status of the image forming unit notified by the signal received from the image forming unit;
   a voltage data generating unit that samples a voltage supplied from the power supply circuit in the determined sampling periods, and generates measured voltage data indicative of the sampled voltage;
   a second memory that stores the generated measured voltage data; and
   an abnormality notification unit that compares the voltage indicated by the measured voltage data stored in the second memory and a predetermined threshold, and determines whether to send an abnormality notification signal depending on a result of the comparison.

7. An image processing apparatus comprising:
   an image scanner operating on power supplied from a power supply circuit, that reads an image of a document and generates image signals indicative of the image;
   a voltage recorder comprising:
   a receiver that receives a signal from the image scanner, notifying an operational status of the image scanner;
   a first memory that stores sampling periods in association with an operational status of the image scanner;

a sampling period determining unit that determines, with reference to the first memory, a sampling period on the basis of the operational status of the image scanner notified by the signal received from the image scanner;

a voltage data generating unit that samples a voltage supplied from the power supply circuit in the determined sampling periods, and generates measured voltage data indicative of the sampled voltage;

a second memory that stores the generated measured voltage data; and an abnormality notification unit that compares the voltage indicated by the measured voltage data stored in the second memory and a predetermined threshold, and determines whether to send an abnormality notification signal depending on a result of the comparison.

8. An image processing apparatus comprising:

a facsimile transmitter operating on power supplied from a power supply circuit, that sends image signals to a terminal via a line;

a voltage recorder comprising:

a receiver that receives a signal from the facsimile transmitter, notifying an operational status of the facsimile transmitter;

a first memory that stores sampling periods in association with an operational status of the facsimile transmitter;

a sampling period determining unit that determines, with reference to the first memory, a sampling period on the basis of the operational status of the facsimile transmitter notified by the signal received from the facsimile transmitter;

a voltage data generating unit that samples a voltage supplied from the power supply circuit in the determined sampling periods, and generates measured voltage data indicative of the sampled voltage;

a second memory that stores the generated measured voltage data; and an abnormality notification unit that compares the voltage indicated by the measured voltage data stored in the second memory and a predetermined threshold, and determines whether to send an abnormality notification signal depending on a result of the comparison.

9. A voltage recording method comprising:

receiving a signal from an apparatus operating on power supplied from a power supply circuit, notifying an operational status of the apparatus;

determining, with reference to a first memory that stores sampling periods in association with an operational status of the apparatus, a sampling period on the basis of the operational status of the apparatus notified by the signal received from the apparatus;

sampling a voltage supplied from the power supply circuit in the determined sampling periods, and generating measured voltage data indicative of the sampled voltage;

storing the generated measured voltage data in a second memory; and comparing the voltage indicated by the measured voltage data stored in the second memory and a predetermined threshold, and determining whether to send an abnormality notification signal depending on a result of the comparison.

* * * * *